United States Patent [19]

Hayes

[11] 4,163,954
[45] Aug. 7, 1979

[54] HIGH ENERGY COHERENT PULSE SOURCE FOR LASER SYSTEM

[75] Inventor: Cecil L. Hayes, Placentia, Calif.

[73] Assignee: Rockwell International Corporation, El Segundo, Calif.

[21] Appl. No.: 929,888

[22] Filed: Jul. 31, 1978

Related U.S. Application Data

[63] Continuation-in-part of Ser. No. 776,675, Mar. 11, 1977, abandoned.

[51] Int. Cl.² ............................ H01S 3/23; H01S 3/10
[52] U.S. Cl. ......................................... 332/7.51; 356/5; 356/28; 350/169
[58] Field of Search ..................... 332/7.51; 356/5, 28; 343/17.2 R, 100 LR; 73/432 L; 331/94.5 M; 350/169

[56] References Cited

U.S. PATENT DOCUMENTS

| | | | |
|---|---|---|---|
| 3,725,917 | 4/1973 | Sletten et al. | 343/17.2 R |
| 3,731,103 | 5/1973 | O'Meara | 343/100 TD |
| 3,825,341 | 7/1974 | Goto | 356/28 |
| 3,825,845 | 7/1974 | Angelbeck et al. | 332/7.51 |
| 3,877,813 | 4/1975 | Hayes et al. | 356/5 |
| 3,939,474 | 2/1976 | Coleman et al. | 343/17.1 R |

Primary Examiner—Nelson Moskowitz
Attorney, Agent, or Firm—L. Lee Humphries; H. Fredrick Hamann; Rolf M. Pitts

[57] ABSTRACT

A multiple frequency laser technique for enhancing the detection of discrete targets amid a clutter background while also increasing the range performance or power limits of the laser type radar. Each of a plurality of laser oscillators cooperates by heterodyned phase-lock means to provide a mutually exclusive one of a plurality of mutually coherent frequencies, whereby the transmitted continuous wave energy comprises a coherent pulse train.

7 Claims, 7 Drawing Figures

HIGH ENERGY COHERENT PULSE SOURCE FOR LASER SYSTEM

CROSS REFERENCE TO RELATED APPLICATION

This application is a continuation in part of copending U.S. Pat. application Ser. No. 776,675 filed Mar. 11, 1977, now abandoned.

BACKGROUND OF THE INVENTION

In the use of laser oscillators as active sensing devices for illuminating an area or field of view containing a target of interest, the range of detection has been sought to be extended by the use of arrays of pluralities of laser oscillators and also by the phase-locking or slaving of the frequency and phase of such oscillators to that of a reference laser oscillator, as disclosed more fully in my co-pending U.S. Pat. Application Ser. No. 758,626 filed Jan. 12, 1977 for Phase-locking of Independent Laser Oscillators, now U.S. Pat. No. 4,096,448.

The range resolution of an active or ranging detection system or laser type radar is normally limited by the pulsewidth of the transmitted energy, as to limit the ability of an operator or observer to distinguish a point source reflector or discrete cultured target from amid the clutter background in which it occurs. Such limitation and means for overcoming such limitation are described in terms of a microwave radar system in U.S. Pat. No. 3,745,578 issued to Carl R. Barrett et al for "Multiple Frequency Radar System Having Improved Response to Small Targets". Such technique involves the generation of a coherent pulse train within a pulsewidth modulation interval by means of an RF oscillator ($f_o$) and IF spacing oscillator ($f_m$) in bandpass-limited closed-loop cooperation with single sideband modulation means. RF power amplification and the pulsewidth modulation (or switching) of the coherent pulse train is provided by a pulse-modulated RF amplifier output stage. In other words, the mutually coherent multiple frequencies $(f_o+f_m)...(f_o+nf_m)$ giving rise to the coherent pulse train are generated by two (low power) RF oscillators in a bandpass-limited closed-loop radio frequency mixing arrangement, while the power output achieved is limited to that provided by the single RF power output stage.

None of such prior art arrangements teach the generation of laser pulse trains by the use of a plurality of mutually coherent laser frequencies. Nor does such art teach the combining of a plurality of laser oscillators with the use of mutually coherent multiple laser frequencies in order to combine improved system resolution and greater range performance.

SUMMARY OF THE INVENTION

By means of the concept of the subject invention, there is provided laser means for overcoming the above-noted limitations of the prior art by employing an array of a plurality of laser oscillators, each operated at a mutually exclusive one of a plurality of mutually coherent frequencies, whereby a periodic co-phasal relationship occurs among such frequencies.

In a preferred embodiment, the output of each slaved oscillator is combined with that of a reference oscillator for heterodyned detection by a respective one of heterodyne-detection means to provide a heterodyne-detected electrical output. There is also provided frequency synthesizer means responsive to each heterodyne-detected output for generating a plurality of feedback phase-lock control signals, one for each slaved oscillator and having a nominal common frequency indicative of a preselected coherent frequency difference between the reference laser oscillator and such slaved oscillator. There is further provided phase-locking means responsive to the feedback control signal for a mutually exclusive one of the slaved oscillators for control of said one oscillator so as to maintain the output of such one oscillator in a mutually exclusive frequency condition different from and coherent with that of the reference laser.

In normal cooperation of the above-described arrangement, the increased range performance provided by the array or plurality of laser oscillators is further enhanced as to discrete targets by means of the energy-peaking and pulsewidth narrowing of the coherent pulse trains provided by the combined mutually exclusive, but mutually coherent, laser frequencies.

Accordingly, it is an object of the invention to provide improved laser ranging means.

It is another object to provide a laser ranging system having improved resolution.

A further object is to provide a pulse train source of mutually coherent laser pulses for use in a laser ranging system.

These and other objects of the invention will become apparent from the following description, taken together with the accompanying drawings in which:

BRIEF DESCRIPTION OF THE DRAWINGS

In the drawings, like reference characters refer to like parts.

DESCRIPTION OF THE PREFERRED EMBODIMENT

Figure 1:
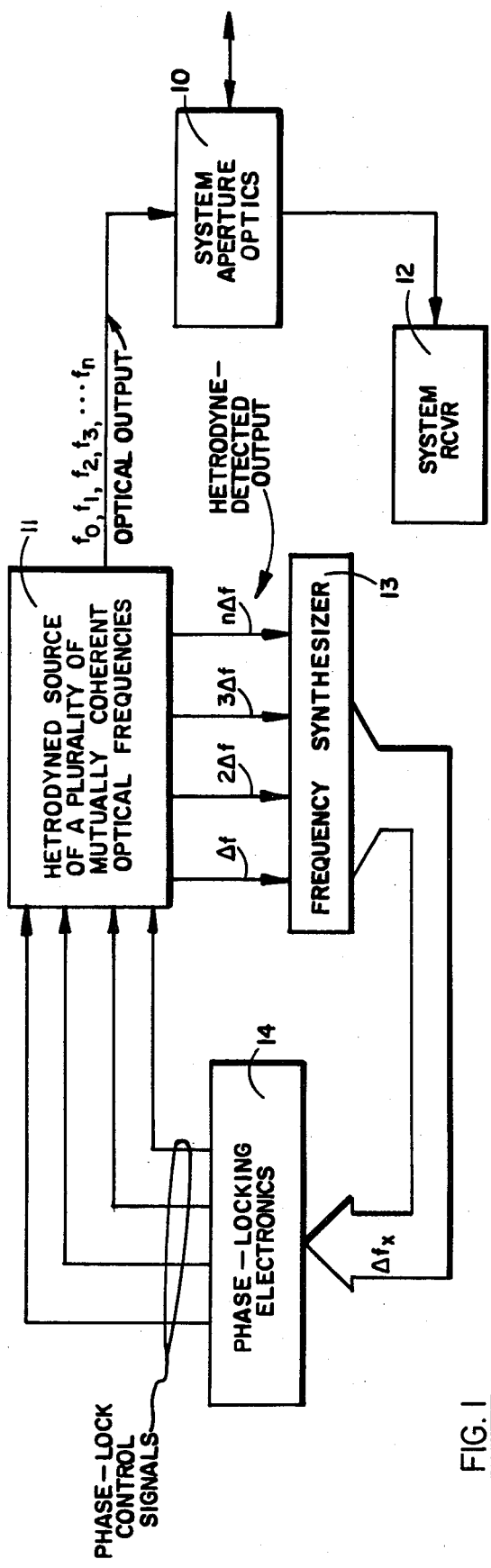
FIG. 1 is a block diagram of a system embodying the concept of the invention.

Referring now to FIG. 1, there is illustrated in block diagram form a laser system embodying the concept of the invention.

There is provided system aperture optics 10 through which laser energy from a source 11 may be directed upon a field of view to be thus illuminated and through which energy reflections (from illuminated targets within the aperture optics field of view) may be detected by means of a receiver 12.

Element 11 comprises a heterodyned laser source of a plurality of mutually coherent optical frequencies $f_o$, $f_1$, $f_2$, $f_3$... $f_n$, a frequency spacing $\Delta f$ being maintained between successive frequencies such that the difference between a reference frequency $f_o$ and a progressive one (n) of the successive frequencies is $n\Delta f$ as manifested by heterodyned-detection of each such successive frequency with the reference frequency $f_o$.

Figure 2:
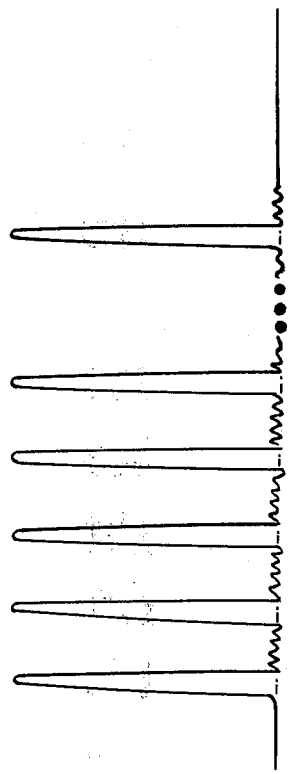
FIG. 2 is an exemplary time history, illustrating a representative coherent pulse train response of the laser transmitter of FIG. 1.

There is also provided in the arrangement of FIG. 1 a frequency synthesizer 13 responsive to each of the heterodyne-detected frequencies $\Delta f$, $2\Delta f$, $3\Delta f$, $n\Delta f$ to provide a corresponding set of control phase and common frequencies $\Delta f_x$ for control of phase-locking electronic means 14 for phase-and-frequency control of the laser frequencies $f_1$–$f_n$ relative to $f_o$ generated by element 11. In this way, the mutual coherence provided by the common spacing frequency $\Delta f$ among the mutually exclusive frequencies of the multiple frequency output of element 11 results in a time history demonstrating a coherent pulse train output as shown in FIG. 2, the center-to-center spacing or time interval $\Delta t$ between pulses corresponding to the reciprocal of the spacing frequency $\Delta f$, while the pulsewidth corresponds to the reciprocal of the product of such spacing frequency and the integer n, as is more fully explained in the above-noted U.S. Pat. No. 3,745,578. In other words, the pulsewidth decreases as the number of mutually coherent laser frequencies is increased, as shown in FIG. 3.

Figure 3:
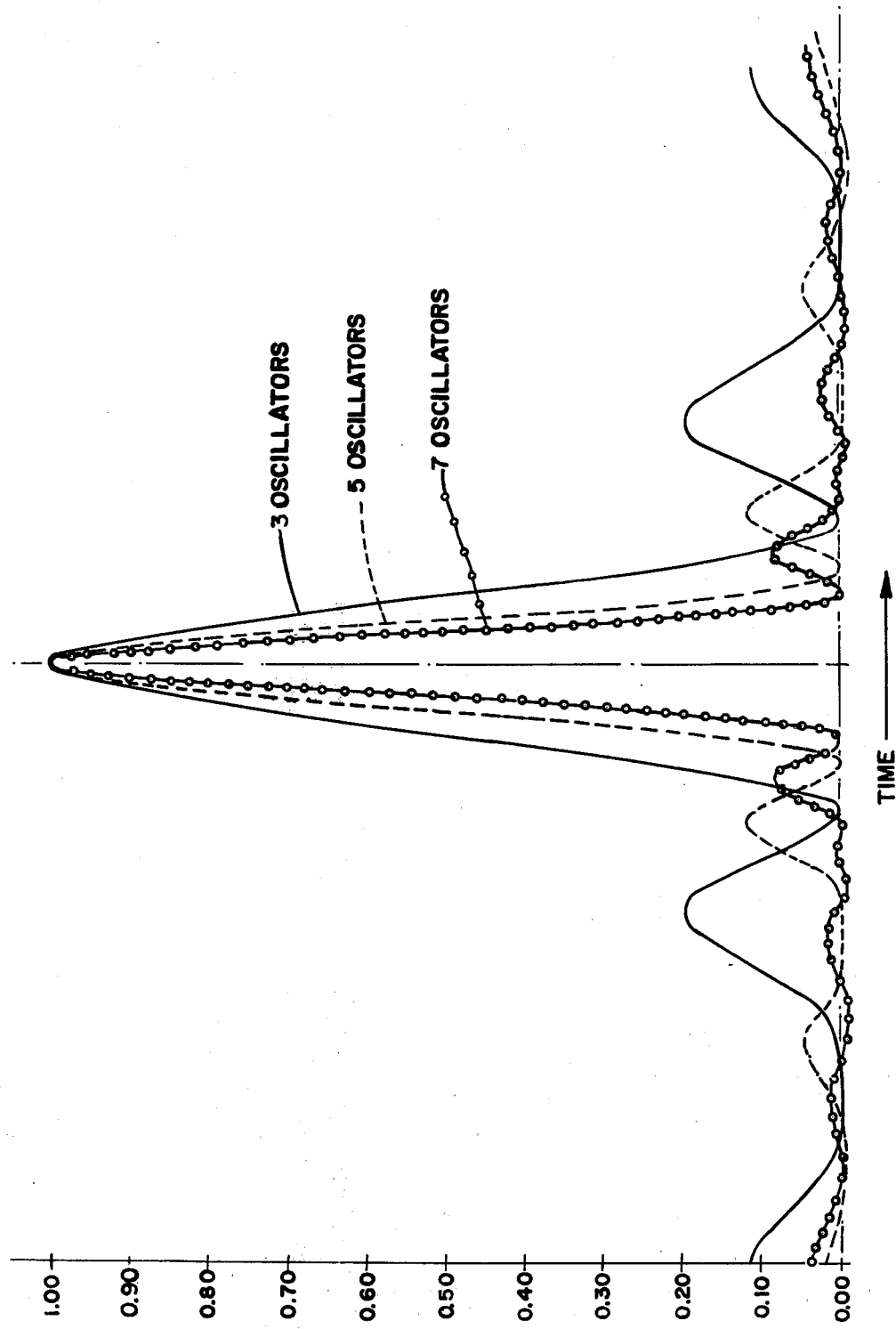
FIG. 3 is a normalized representation of a single one of the pulses of FIG. 2, illustrating the effect of increasing the number of mutually exclusive but mutually coherent frequencies employed.

Referring to FIG. 3, there is illustrated the normalized pulsewidth response (peak power corresponding to unity or 100%) of the output of element 11 (of FIG. 1) for three (3), five (5) and seven (7) mutually exclusive but coherent frequencies, and demonstrating the narrowing of the pulsewidth and reduction in sidelobes with an increase in the number (n) of mutually coherent frequencies.

Figure 4:
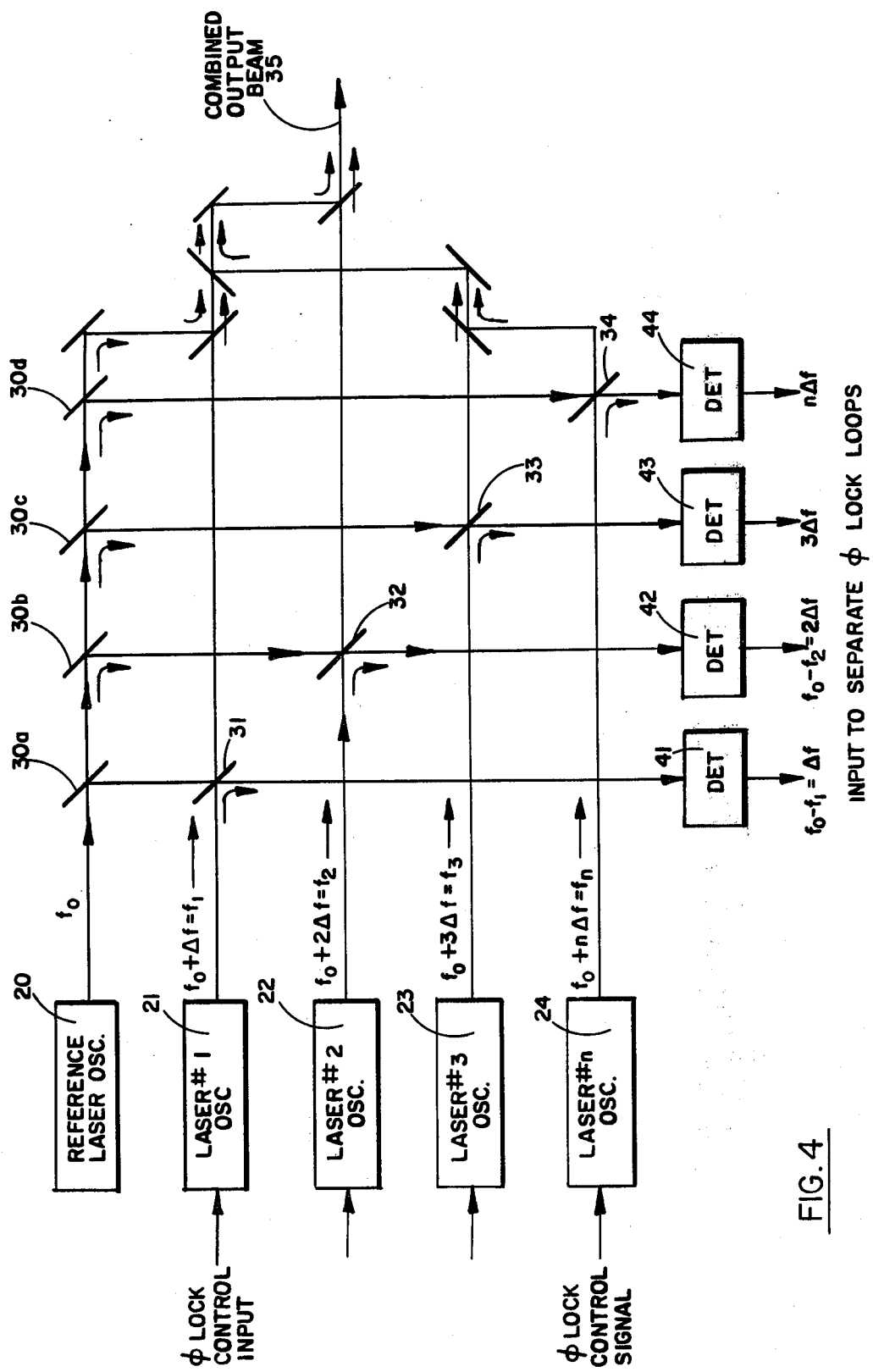
FIG. 4 is a block diagram illustrating the heterodyned laser source of FIG. 1 in fuller detail.

The heterodyned source 11 of FIG. 1 is shown in fuller detail in FIG. 4.

Referring now to FIG. 4, there is shown in block diagram form the heterodyned source 11 of a plurality of mutually coherent optical frequencies (of FIG. 1). There is provided a reference laser oscillator 20 and a plurality of slaved oscillators 21, 22, 23 and 24, the control or slaving of each of which occurs in response to a respective input from the phase locking means 14 of FIG. 1. Each of the slaved oscillators provides an output frequency corresponding to the sum of the reference oscillator output frequency $f_o$ and a successive integer multiple of a spacing frequency $\Delta f$. Thus, first slaved oscillator 21 generates a first frequency $f_1 = f_o + \Delta f$, second slaved oscillator 22 generates a second frequency $f_2 = f_o + 2\Delta f$ and nth slaved oscillator 24 generates a frequency $f_n = f_o + n\Delta f$.

The outputs of oscillators 20, 21, 22, 23 and 24 are optically combined in FIG. 4 as output beam 35, the frequency and phase relationships of the component energies of which cooperate to provide the coherent pulse train depicted in FIG. 2.

Also shown in FIG. 4 are like means for combining a sampled output of each of slaved oscillators 21–24 with a sampled output of reference oscillator 20 for heterodyned detection of the slaved oscillator difference frequencies $n\Delta f$ and comprising photodetectors 41, 42, 43 and 44 in cooperation with beam splitters 30a, 30b, 30c, 30d, 31, 32, 33 and 34. For example, the output of oscillator 21 is projected upon detector 41 by means of beam splitter 31 and the output of reference oscillator 20 is projected upon detector 41 by means of beam splitter 30a, whereby heterodyne detection by detector 41 provides an electrical output corresponding to the phase and frequency difference $(\Delta f = f_1 - f_o)$ between the two optical inputs thereto. Similarly, successive detectors cooperate with the reference oscillator and a successive slaved oscillator to develop a heterodyne detected output. Thus, beam splitter 34 projects the output of oscillator 24 upon detector 44 and beam splitter 30d projects the output of reference oscillator 20 upon detector 44 whereby a heterodyne-detected signal is provided having a phase and frequency ($n\Delta f$) indicative of the difference ($f_n - f_o$) between the outputs of oscillators 20 and 24.

Figure 5:
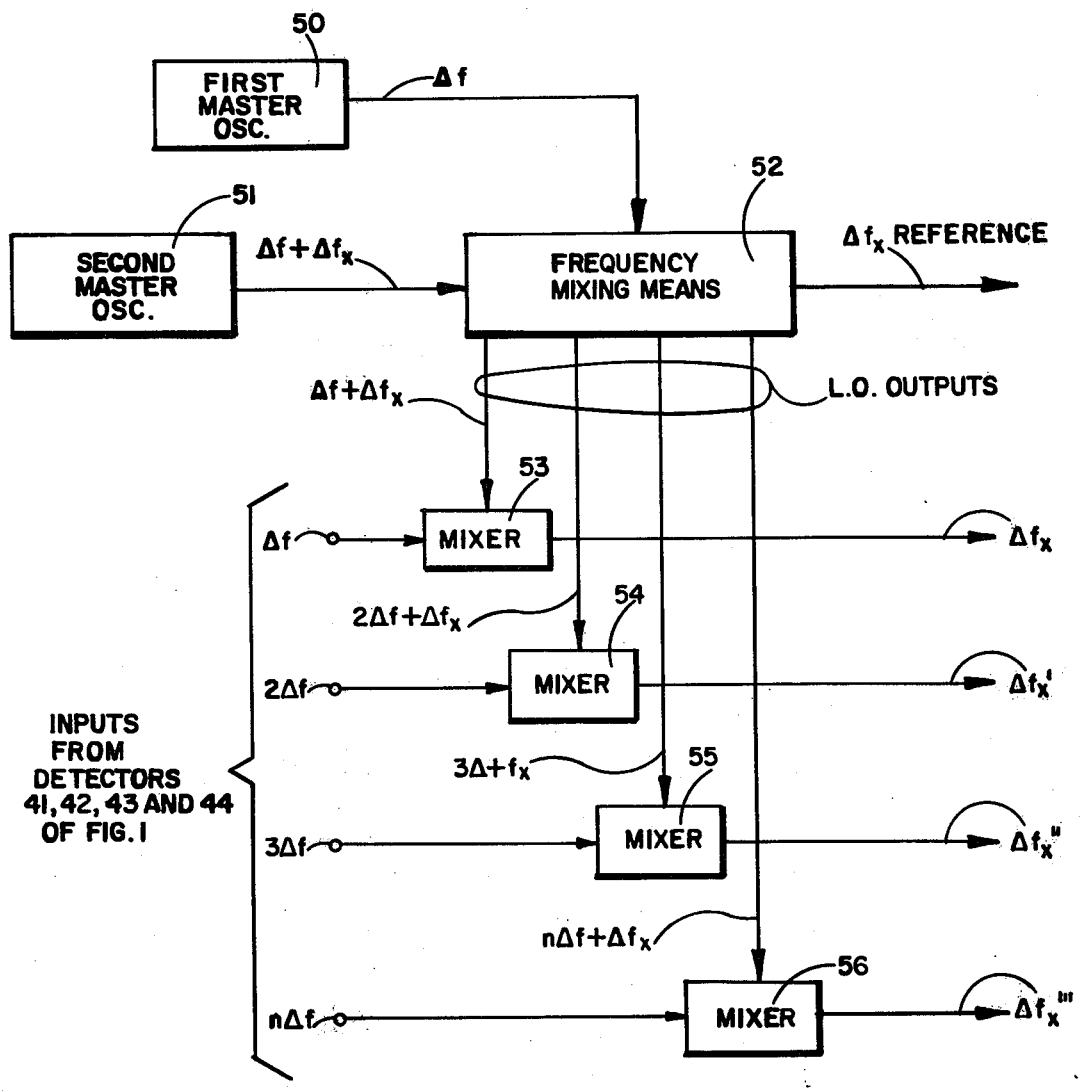
FIG. 5 is a block diagram illustrating the frequency synthesizer of FIG. 1 in fuller detail.
Figure 6:
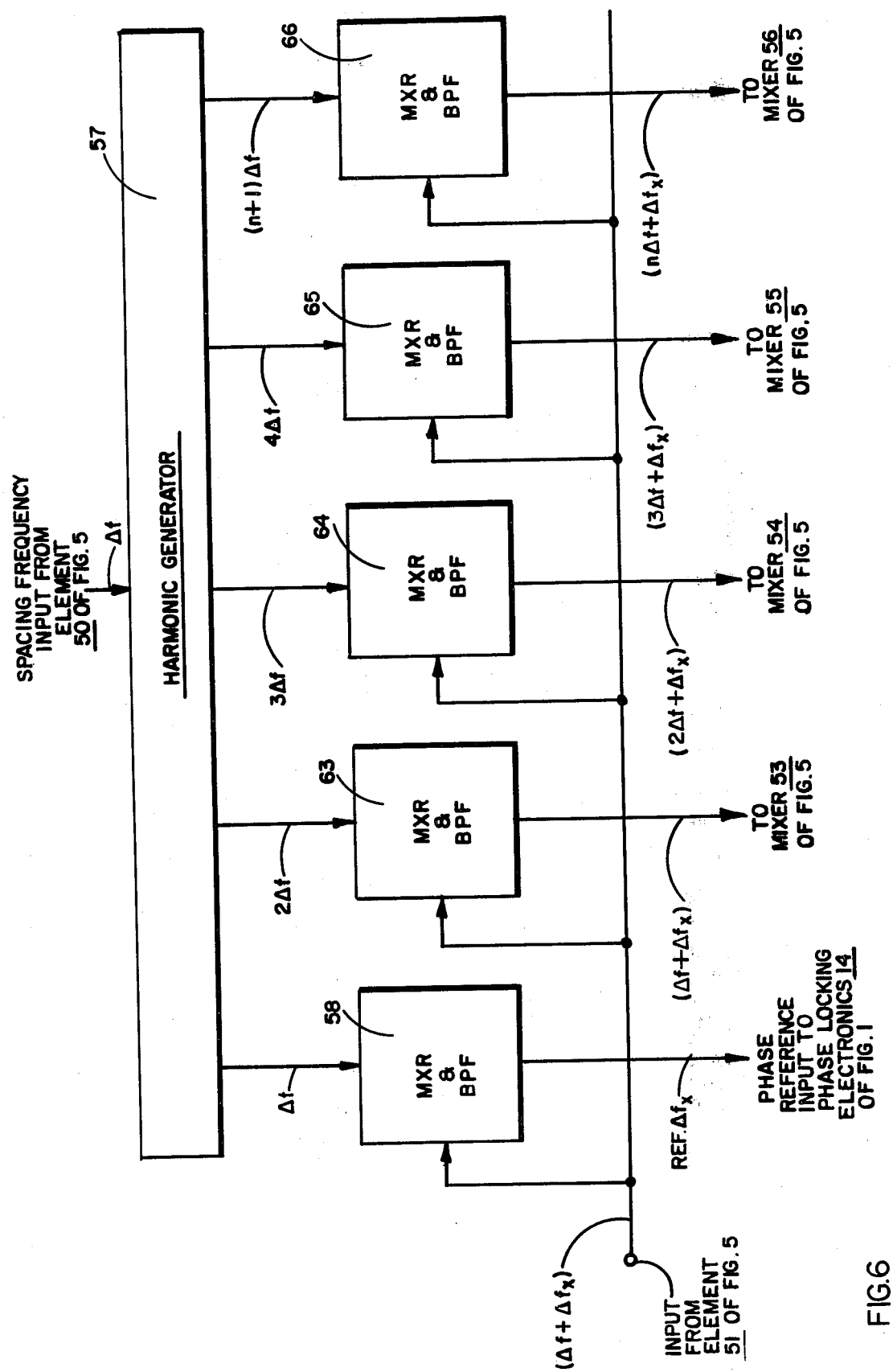
FIG. 6 is a block diagram of the frequency mixing means employed in the arrangement of FIG. 5.

The outputs of heterodyne detectors 41, 42, 43 and 44 are employed by frequency synthesizer 13 of FIG. 1 to develop common mode ($\Delta f_x$) control signals for each of the phase locking means of element 14, as is shown more fully in FIGS. 5 and 6.

Referring to FIG. 5, there is illustrated in block diagram form frequency synthesizer 13 of FIG. 1 for generating a control signal nominally of frequency $\Delta f_x$ and of a mutually distinct phase respectively associated with each of heterodyne detectors 41, 42, 43 and 44 of FIG. 4. There is provided (in the arrangement of FIG. 5) a first master RF oscillator 50 having a first RF output frequency $\Delta f$ and a second master RF oscillator 51 having a second RF output frequency $\Delta f + \Delta f_x$ equal to the sum of the system spacing frequency $\Delta f$ and the control signal frequency $\Delta f_x$. Frequency mixing means 52 responsive to said first and second master RF oscillators 50 and 52 provides a plurality of output frequencies ($n\Delta f + \Delta f_x$), each equal to the sum of the control signal frequency $\Delta f_x$ and a successive integer multiple (n) of the spacing frequency $\Delta f$. A like plurality of mixers 53, 54, 55 and 56 as slaved oscillators, each mixer responsive to a mutually exclusive output of said frequency synthesizer means and a mutually exclusive one of the heterodyne detection means 41, 42, 43 and 44 (of FIG. 4), provides a nominal output of common frequency $\Delta f_x$ and unique phase as a reference input to a mutually exclusive mode of the phase-lock control means 14 of FIG. 1, shown more particularly in FIG. 7. For example, first mixer 53 in FIG. 5 is responsive to a first output ($\Delta f + \Delta f_x$) of element 52 and the $\Delta f$ output of detector 41 (in FIG. 4) to provide a difference output $\Delta f_x$; second mixer 54 is responsive to a second output ($2\Delta f + \Delta f_x$) of element 52 and the $2\Delta f$ output of detector 42 (in FIG. 4) to provide a difference output $\Delta f_x'$; and the nth mixer 56 is responsive to the nth output ($n\Delta f + \Delta f_x$) of element 52 and the $n\Delta f$ output of detector 44 (of FIG. 4) to provide a difference output $\Delta f_x'''$.

In an exemplary embodiment, as shown in FIG. 6, element 52 of FIG. 5 may be comprised of a harmonic generator 57, bandpass filtered mixer 58, and additional bandpass filtered mixers 63, 64, 65 and 66. Harmonic generator 57 is responsive to the $\Delta f$ input (from oscillator 50 of FIG. 5) for generating harmonics thereof, while each mixer is responsive to the ($\Delta f + \Delta f_x$) input from oscillator 51 of FIG. 5 and to a mutually exclusive one of the harmonic outputs of generator 57. The $\Delta f_x$ output of mixer 58 is employed as a phase reference input by the phase locking electronics 14 of FIG. 1, shown more particularly in FIG. 7.

Figure 7:
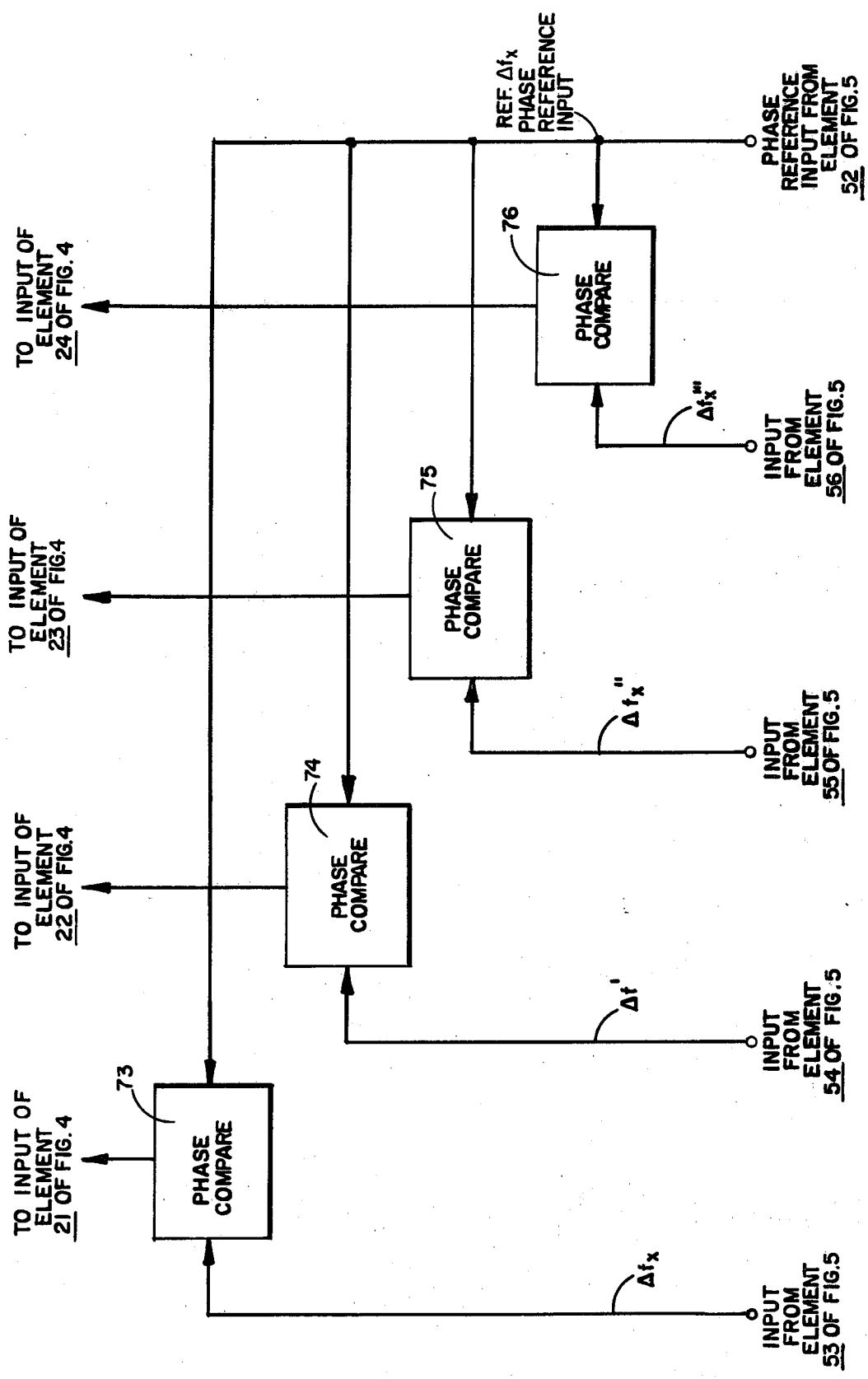
FIG. 7 is a block diagram of the phase-locking means 14 employed in the arrangement of FIG. 1.

Referring now to FIG. 7, there is illustrated in block diagram form the phase locking electronics of FIG. 1. There are provided a like plurality of phase comparators 73, 74, 75 and 76 as slaved oscillators (in FIG. 4) each of which phase comparator has a phase reference input responsively coupled to the reference $\Delta f_x$ output of element 52 of FIG. 5 (and corresponding to the output of element 58 in FIG. 6) and further having a second input coupled to an output of a respective one of mixers 63, 64, 65 and 66 of FIG. 5 for control of a corresponding one of the slaved oscillators of FIG. 4. For example, first phase comparator 73 has a second input responsively coupled to element 53 of FIG. 5 for control of first slaved oscillator 21 of FIG. 4 in accordance with the phase difference between the reference $\Delta f_x$ and the $\Delta f_x$ input and in such a sense as to reduce such difference. Similarly, nth phase comparator 76 has a second input responsively coupled to nth mixer 56 of FIG. 5 for control of nth slaved oscillator 24 in FIG. 4 in accordance with the phase difference between the reference $\Delta f_x$ and the $\Delta f_x'''$ input. In this way a common frequency reference is employed as a phase reference for phase-and-frequency slaving of the slaved oscillators to a set of mutually exclusive but mutually coherent frequencies, whereby the combined output energies therefrom provide a coherent pulse train.

Accordingly, there has been described an improved laser transmitter providing improved point source target discrimination at greater ranges by means of an array of a plurality of laser oscillators operated in combination and at different but mutually coherent frequencies.

Although the invention has been disclosed and illustrated in detail, it is to be clearly understood that the same is by way of illustration and example only and is not to be taken by way of limitation, the spirit and scope of this invention being limited only by the terms of the appended claims.

I claim:

1. A pulse train source of mutually coherent laser pulses, said source comprising a plurality of laser oscillators each phase locked to a mutually exclusive one of a plurality of periodically mutually coherent frequencies, said plurality of laser oscillators comprising a reference laser oscillator of frequency $f_o$, and a plurality (n) of slaved laser oscillators of frequencies ($f_o + n\Delta f$) and in which there is further provided a like number of phase-locking means as slaved oscillators, each said phase-locking means responsive to said reference oscillator and to a mutually exclusive one of said slaved oscillators for maintaining the frequency $f_n$ and phase of said one to a frequency ($f_o + n\Delta f$) different from and mutually coherent with that of said reference laser oscillator by an integer multiple (n) of a spacing frequency $\Delta f$ which is a radio-frequency substantially less than the laser frequency of the reference oscillator.

2. The device of claim 1 in which the output of each said slaved oscillator is combined with that of said reference oscillator for heterodyned detection by a respective one of heterodyne-detection means to provide a heterodyne-detected electrical output, $n\Delta f$, and in which there is further provided mixer electronics responsive to each said heterodyne-detected output and generating a plurality of feedback phase-lock control signals, one for each of said slaved oscillators and having a frequency indicative of a frequency difference between the reference laser oscillator and a mutually exclusive one of said slaved oscillators, and each of said phase-locking means being responsive to the feedback control signal for said mutually exclusive one of said slaved oscillators for control of said one oscillator so as to maintain the output of said slaved oscillator in a mutually exclusive frequency condition different from and coherent with that of said reference laser.

3. The device of claim 1 in which the output of each said slaved oscillator is combined with that of said reference oscillator for heterodyned detection by a respective one of heterodyne detection means to provide a heterodyne-detected electrical output, $n\Delta f$, and in which there is further provided:

a first master RF oscillator having a first RF output frequency $\Delta f$, a second master RF oscillator having a second RF output frequency $\Delta f + \Delta f_x$ equal to the sum of the system spacing frequency $\Delta f$ and a control signal frequency $\Delta f_x$, frequency mixing means responsive to said first and second master RF oscillators for providing a plurality of output frequencies ($n\Delta f + \Delta f_x$), each equal to the sum of the control signal frequency $\Delta f_x$ and a successive integer multiple (n) of said spacing frequency, $\Delta f$, and a like plurality of mixers as slaved oscillators, each mixer responsive to a mutually exclusive output of said frequency synthesizer means and a mutually exclusive one of said heterodyne detection means for commonly providing a nominal output frequency $\Delta f_x$ as a reference input to a mutually exclusive one of said phase-locking means.

4. The device of claim 3 in which a successive one of the mixers is responsive to a successive one of the frequency synthesizer outputs ($n\Delta f + \Delta f_x$) and to that one of the heterodyne detection means responsive to a successive one of the slaved oscillators for providing an output frequency $\Delta f_x$ as a reference input to that phase-lock control means associated with said successive one of said slaved oscillators.

5. A pulse train source of mutually coherent laser pulses comprising a reference laser oscillator (of frequency $f_o$), a plurality (n) of slaved laser oscillators, each operated at a mutually exclusive one of a plurality of frequencies periodically mutually coherent with that of said reference laser oscillator, and a like number of phase-locking means as slaved oscillators, each said phase-locking means responsive to said reference oscillator and to a mutually exclusive one of said slaved oscillators for maintaining the frequency $f_n$ and phase of said one at a frequency ($f_o + n\Delta f$) different from and mutually coherent with that of said reference laser oscillator by an integer multiple (n) of a spacing frequency $\Delta f$.

6. The device of claim 5 in which there is further provided a like plurality of heterodyne detection means as slaved oscillators, each responsive to said reference oscillator and to a mutually exclusive one of said slaved oscillators for providing an output frequency $n\Delta f$ indicative of the frequency difference between said reference oscillator and a successive one (n) of said slaved oscillators, frequency synthesizer means responsive to each of said heterodyne detection means associated with a respective slaved oscillator for providing a plurality of mutually exclusive control signals, each of substantially like frequency for control of that phase-locking means associated with such respective one of said slaved oscillators.

7. The device of claim 6 in which said frequency synthesizer is comprised of a first master RF oscillator having a first RF output frequency $\Delta f$;

a second master RF oscillator having a second RF output frequency $\Delta f + \Delta f_x$ equal to the sum of the system spacing frequency $\Delta f$ and a control signal frequency $\Delta f_x$;

frequency mixing means responsive to said first and second master RF oscillators for providing a plurality of output frequency $(n\Delta f + \Delta f_x)$, each equal to the sum of the control signal frequency $\Delta f_x$ and a successive integer multiple (n) of said spacing frequency, $\Delta f$; and a like plurality of mixers as slaved oscillators, said mixer responsive to a mutually exclusive output of said frequency mixing means and to a mutually exclusive one of said heterodyne detection means for providing a nominal output of common frequency $\Delta f_x$ and unique phase as a reference input to a mutually exclusive one of said phase-locking means.

* * * * *